United States Patent
Geoffrion et al.

(10) Patent No.: US 12,040,666 B2
(45) Date of Patent: Jul. 16, 2024

(54) METHOD OF MAKING ELECTRIC MACHINE WINDINGS WITH SEGMENTED CONDUCTORS

(71) Applicant: BorgWarner Inc., Auburn Hills, MI (US)

(72) Inventors: Gregory F. Geoffrion, Pendleton, IN (US); Kirk Neet, Noblesville, IN (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

(21) Appl. No.: 17/119,522

(22) Filed: Dec. 11, 2020

(65) Prior Publication Data
US 2021/0184549 A1    Jun. 17, 2021

Related U.S. Application Data

(60) Provisional application No. 62/947,238, filed on Dec. 12, 2019.

(51) Int. Cl.
*H02K 15/04* (2006.01)
*H02K 3/28* (2006.01)

(52) U.S. Cl.
CPC ........... *H02K 15/0421* (2013.01); *H02K 3/28* (2013.01)

(58) Field of Classification Search
CPC .. H02K 15/0478; H02K 15/0421; H02K 3/12; H02K 3/28; H02K 15/0025
See application file for complete search history.

(56) References Cited

U.S. PATENT DOCUMENTS

| | | | | |
|---|---|---|---|---|
| 4,864,715 A | * | 9/1989 | Sadier | H02K 3/12 |
| | | | | 29/596 |
| 10,038,358 B2 | * | 7/2018 | Murphy | B21F 35/04 |
| 2007/0277899 A1 | * | 12/2007 | Neet | H02K 15/0421 |
| | | | | 140/105 |
| 2015/0076945 A1 | | 3/2015 | Kudou et al. | |
| 2020/0169151 A1 | * | 5/2020 | Hashimoto | H02K 15/0428 |

FOREIGN PATENT DOCUMENTS

| | | | |
|---|---|---|---|
| DE | 112017001630 T5 * | 12/2018 | ............ H02K 3/04 |
| JP | 2002135936 A * | 5/2002 | |
| JP | 2014-075952 A | 4/2014 | |
| KR | 10-2018-0092575 A | 8/2018 | |
| WO | 2018-181368 A1 | 4/2018 | |
| WO | 2019-152773 A1 | 8/2019 | |

* cited by examiner

*Primary Examiner* — Livius R. Cazan (74) *Attorney, Agent, or Firm* — Maginot, Moore & Beck, LLP (57) ABSTRACT

A method of forming a winding for an electric machine includes first bending a wire between a plurality of forming structures such that the wire is bent into a zigzag shape. Thereafter, the method includes cutting the wire at a plurality of cut locations along the zigzag shape to form a plurality of segmented conductors, each of the segmented conductors including an end turn and two legs.

15 Claims, 7 Drawing Sheets

METHOD OF MAKING ELECTRIC MACHINE WINDINGS WITH SEGMENTED CONDUCTORS

CROSS-REFERENCE TO RELATED APPLICATIONS

This application claims priority from U.S. Provisional Patent Application Ser. No. 62/947,238, filed Dec. 12, 2019, the entire contents of which are incorporated by reference herein.

FIELD

This application relates to the field of electric machines, and more particularly, a method of making windings for electric machines.

BACKGROUND

A stator generally consists of a stator core, windings, and insulation. The stator core is comprised of stack of steel laminations or related ferromagnetic material. The lamination stack is typically provided as a cylindrical structure defining a central axis, an outer diameter (OD), and an inner diameter (ID), with slots extending from either the OD or the ID. The windings are formed from a conductive metal such as copper. The windings include slot segments disposed in the stator slots and end turns extending between the slot segments. Each end turn provides a conductive path that connects two slot segments. Insulation is provided in the slots of the stator core in order to insulate the stator core from the electrically conductive windings (and particularly the slot segments extending through the slots).

Figure 12:
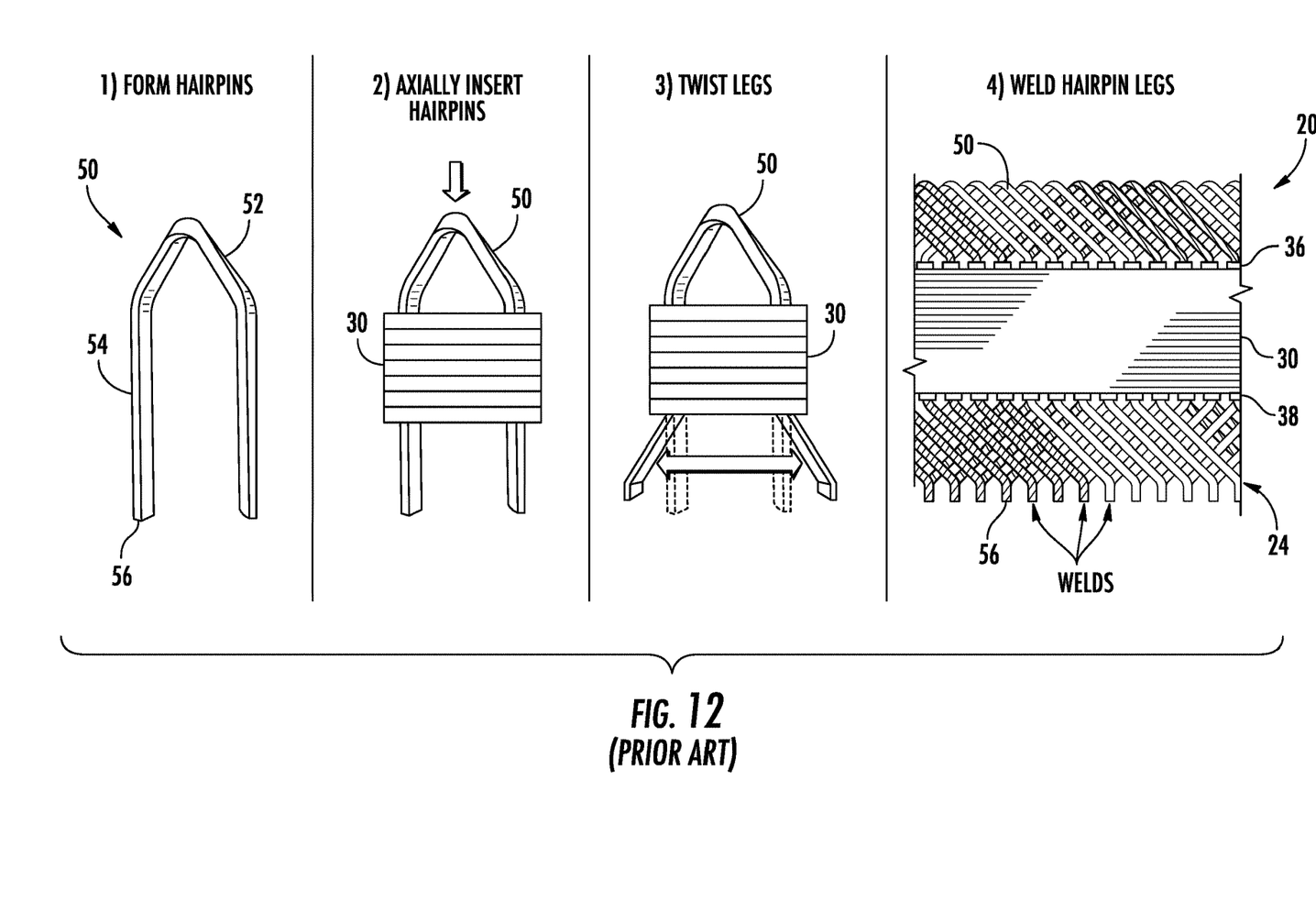
FIG. 12 is an illustration of a four step conventional method for forming a winding in an electric machine.

One method of making a stator is to form windings from segmented conductors (which segmented conductors may also be referred to as "hairpins," "hairpin conductors," or "U-shaped conductors," and windings from such segmented conductors may be referred to as "segmented windings" or "hairpin windings"). As shown in FIG. 12, formation of a hairpin winding is generally comprised of the following acts.
1) First a plurality of hairpins 50 are formed by bending short lengths of wire into a desired U-shape, each hairpin including a U-turn 52 (which may also be referred to as an "end turn") that connects two elongated straight portions 54 (which may also be referred to as "axial portions" or "legs").
2) After forming the hairpins 50, the legs 54 are inserted axially into the slots of a stator core 30 such that the U-turns are arranged on an insertion end 36 of the stator core and the legs extend axially from the connection end 38 of the stator core.
3) Following insertion, the legs 54 extending from the connection end of the stator core are twisted such that each leg end 56 is adjacent to the leg end of another segmented conductor.
4) Thereafter, the ends 56 of adjacent legs are welded together to form a complete winding 24 arranged on a stator 20.

Unfortunately, the first step of the foregoing process illustrated in FIG. 12 can be problematic and inefficient. In particular, the process of making the U-shape for each hairpin is time consuming and expensive. The conventional process is to take a short segment of wire and bend it around a mandrel in 3 different places to form the U shape hairpin. A significant issue is the large number of hairpins that are required to make one stator. For example, if a stator has a three phase winding with segmented conductors arranged in seventy-two slots (with the legs of each segmented conductor in two different slots) and eight layers in each slot (i.e., each slot includes a leg from one of eight different segmented conductors), the stator will need two hundred eighty eight individual hairpins (8*72/2=288). Making such a large number of hairpins is both time consuming and expensive, thus adding to the overall cost and production time for each electric machine.

In view of the foregoing, it would be advantageous to provide for an improved method for making a stator winding. It would be particularly advantageous if a segmented winding could be made in less time and at less cost than conventional segmented windings. It would also be advantageous if the formation of the stator winding resulted in little waste of time and resources.

SUMMARY

In accordance with at least one embodiment of the disclosure, a method of forming a winding for an electric machine includes first bending a wire between a plurality of forming structures such that the wire is bent into a zigzag shape. Thereafter, the method includes cutting the wire at a plurality of cut locations along the zigzag shape to form a plurality of segmented conductors, each of the segmented conductors including an end turn and two legs.

In at least one embodiment of the disclosure, a method of making segmented conductors for an electric machine winding is disclosed. The method includes first bending a wire into a zigzag shape, the zigzag shape defining a plurality of first end turns on one side of the zigzag shape, a plurality of second end turns on an opposite side of the zigzag shape, and a plurality of straight portions extending between the first end turns and the second end turns. During the act of bending, the plurality of first end turns are bent simultaneously in order to form the zigzag shape. Thereafter, the method includes cutting the wire at a plurality of cut locations along the zigzag shape to form a plurality of segmented conductors, each of the segmented conductors including an end turn and two legs.

In at least one additional embodiment of the disclosure a method of making segmented conductors for an electric machine winding includes forming an elongated wire into a series of alternating first end turns and opposing second end turns with straight portions connecting the first end turns to the second end turns. The method further includes cutting the wire at a plurality of segmented conductors, each of said segmented conductors including an end turn and two legs.

While it would be desirable to provide a method of making electric machine windings that provides one or more of the foregoing or other advantageous features, as may be apparent to those reviewing this disclosure, the teachings disclosed herein extend to those embodiments which fall within the scope of the appended claims, regardless of whether they accomplish one or more of the above-mentioned advantages.

DESCRIPTION

A process for forming segmented conductors for an electric machine winding is disclosed herein. As described below, the process generally involves bending an elongated stretch of wire into a zigzag shape with multiple end turns and straight portions connecting the end turns. The method further includes strategically cutting the wire at various locations in order to form a plurality of separate segmented conductors. Thereafter, the method includes inserting the cut segments of wire into a stator core in order to form a segmented winding in an electric machine. The process advantageously allows segmented windings for an electric machine to be formed more quickly and less expensively than prior art windings.

With reference now to the embodiment shown in FIGS. 1-4, the method of forming segmented conductors begins with obtaining one or more elongated wires 40 that will be used for the electric machine windings. Each wire 40 is comprised of an appropriate conductive material for an electric machine, such as a copper or other appropriate electrically conductive material. In at least some embodiments, the wire is pre-coated with a generally non-conductive insulative material, such as a plastic, silk, or epoxy. In at least some embodiments, the wire 40 has a square or rectangular cross section. However, in alternative embodiments, the wire 40 may have a round, oval or other cross-sectional shape. In any event, the wire 40 is of sufficient length to be wound through numerous slots of a stator core and form a plurality of end turns and straight portions for a winding arrangement. The length of the wire 40 is sufficient to form multiple end turns having a winding pitch (e.g., a standard winding pitch equal to the # of slots per pole per phase times the number of phases for the winding, or a related winding pitch), and multiple straight portions for a stator core having a predetermined size. In at least some embodiments, the wire 40 is of sufficient length to be wound around the stator core for at least one full revolution while forming the series of alternating end turns and straight portions.

Figure 2:
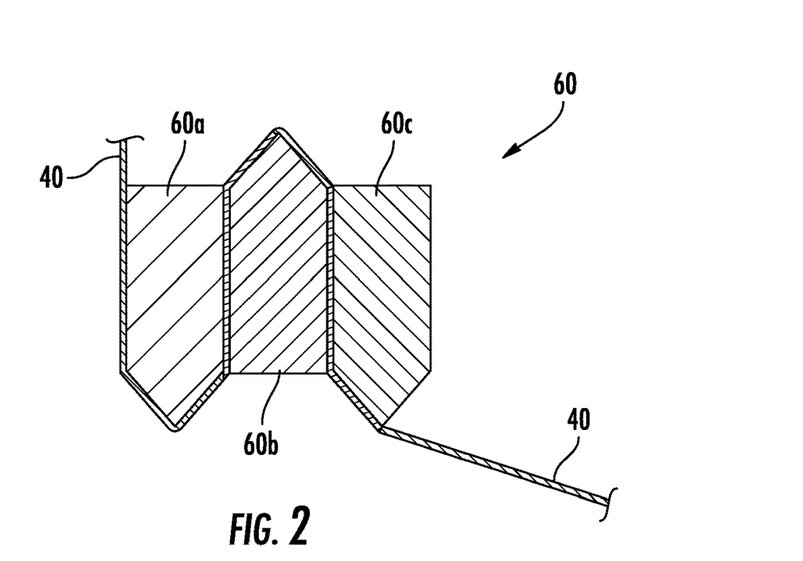
FIG. 2 shows the forming structures of FIG. 1 in contracted/together configuration with the elongated wire bent into a zig-zag configuration/shape.
Figure 3:
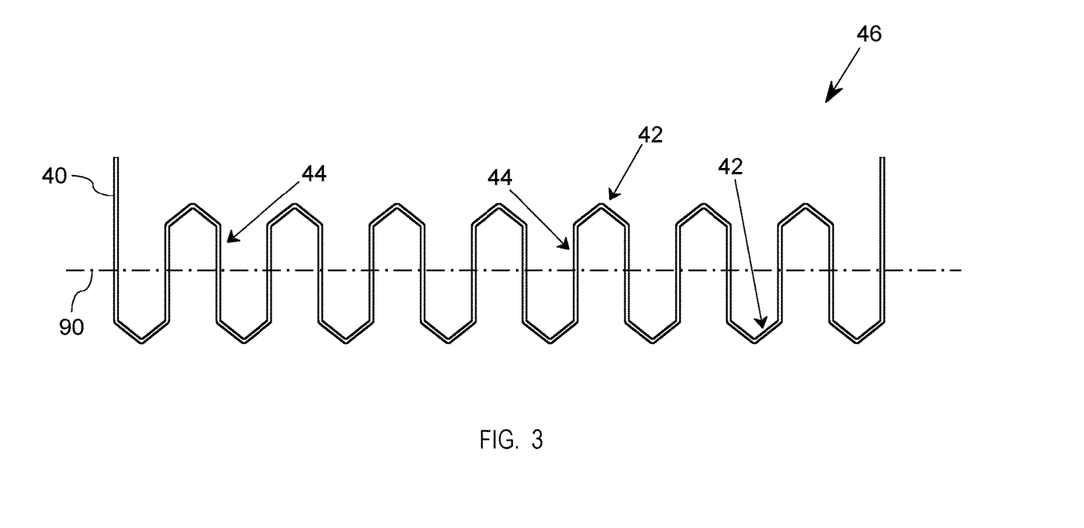
FIG. 3 shows the zig-zag wire of FIG. 2 removed from the forming structures.

After an appropriate type and length of wire 40 is selected, a bending process is used to form the wire into a long zigzag configuration/shape 46 (e.g., as shown in FIG. 3). When bent into the long zigzag configuration, the wire 40 defines a series of alternating end turns 42 and axial portions 44. The long zig-zag shape of the insulated copper wire may generally be defined by N axial portions (or slot segments) and N-1 end loops. The zigzag wire configuration 46 may be formed using any of various processes as are known in the art. For example, the zigzag wire configuration may be formed by sequentially introducing a series of separate forming structures 60, such as that shown in FIGS. 1 and 2.

Figure 1:
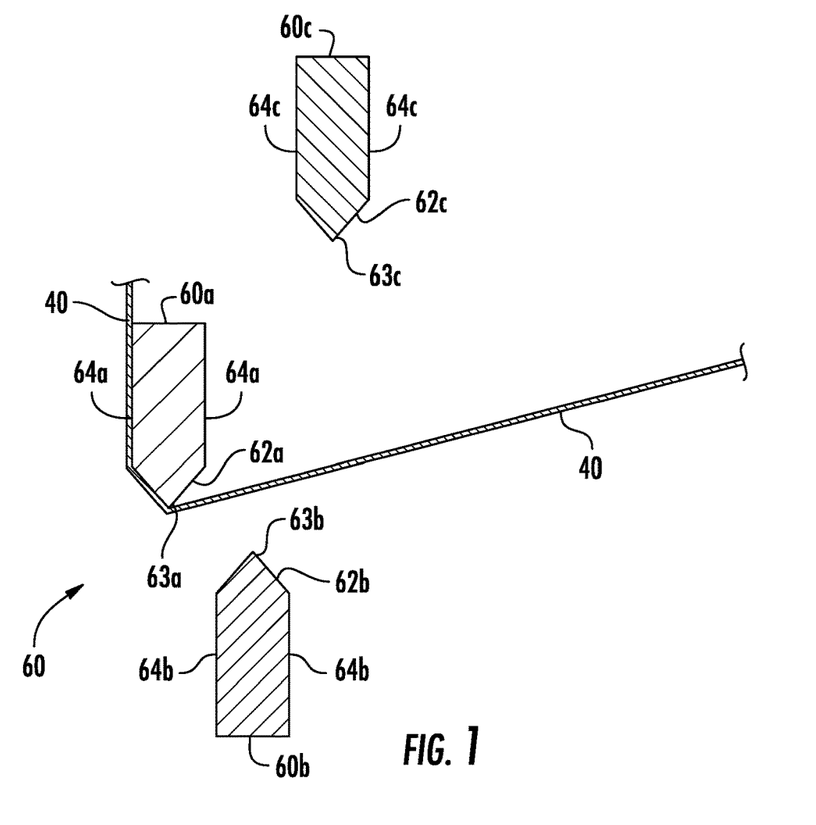
FIG. 1 shows a plan view of a plurality of forming structures in an expanded/remote configuration with an elongated wire extending between the forming structures.

In the embodiment of FIGS. 1 and 2, the forming process begins when a first forming structure 60a is introduced. The first forming structure 60a includes a U-turn surface 62a (which may also be referred to as a "reversal surface") and two axial surfaces 64a. The U-turn surface 62a has an orientation such that the apex 63a of the surface points in a first direction (e.g., downward as shown in FIGS. 1 and 2). The two axial surfaces 64a are straight and parallel to one another, and the U-turn surface 62a extends between the two axial surfaces 64a. After introduction of the first forming structure 60a, the wire 40 is wrapped around the first forming structure 60. This process involves positioning the wire 40 along one of the axial surfaces 64a, and then bending the wire around the U-turn surface 62a, as shown in FIG. 1. After being bent around the U-turn surface 62a, the wire reverses direction and is positioned along the other axial surface 64a of the first forming structure 60a.

After the wire 40 is bent around the first forming structure 60a, a second forming structure 60b is introduced. The second forming structure 60b is generally identical to the first forming structure 60a, and includes two axial surfaces 64b and a U-turn surface 62b. However, the orientation of the U-turn surface 62b of the second forming structure 60b is opposite from the orientation of the U-turn surface 62a of the first forming structure 60a (i.e., the second U-turn surface 62b has upward pointing apex 63b as shown in FIGS. 1 and 2). The second forming structure 60b is introduced by placing a first of the axial surfaces 64b against the wire 40 with the axial surfaces 64b of the second forming structure 60b parallel to the axial surfaces 64a of the first forming structure 60a. This results in the wire 40 being trapped between the axial surfaces of two different forming structures (i.e., 60a and 60b). The wire 40 is then wrapped around the second end turn surface 62b such that the wire 40 follows the shape of the U-turn surface 62a and straight axial surfaces 64b of the second forming structure 60b.

After the wire 40 is wrapped around the second forming structure 60b, a third forming structure 60c is introduced. The third forming structure 60c is identical to the first forming structure, and includes a U-turn surface 62c (with a downward facing apex 63c), and two axial surfaces 64c. The wire is then wrapped around the third forming structure 60c, in a manner similar to that of the first and second forming structures 60a and 60b, such that the wire begins to take on a zig-zag configuration. This process of introducing alternating forming structures and wrapping the wire around the new forming structure is then repeated for a predetermined number of times (e.g., until the length of wire comes to an end, a desired length of wire is used, a desired number of forming structures are used).

While FIGS. 1 and 2 illustrate one embodiment of a bending process for the wire 40, it will be recognized that any number of different bending processes may be used. Another example of a bending process for conveniently rendering the wire into the long zigzag configuration is utilization of a wire forming apparatus such as that disclosed in U.S. Pat. No. 10,038,358, the entire contents of which are incorporated herein by reference. With such a wire forming apparatus, a series of opposing forming structures are initially positioned in an expanded position, and a straight length of wire is arranged between the opposing forming structures. The forming structures are then simultaneously moved from the expanded position to a contracted position, thereby simultaneously forming the plurality of end turns and in-slot portions. The simultaneous forming process greatly increases the speed of forming the long wire into the zig-zag shape, and thus allows stators with continuous windings to be produced more quickly and easily. Yet another example of a process for bending the wire is to manually bend the wire 40 into a zigzag configuration (e.g., with the use of pliers or other hand tools).

Upon completion of the bending process, the elongated length of wire 40 is rendered in a long zigzag wire shape/configuration 46, such as that shown in FIG. 3. In the zigzag configuration, the wire 40 is defined by a series of alternating straight axial portions 44 and U-turns 42. With the wire 40 in this zigzag shape, it may then be cut in several locations along a cut line 90 (shown as a dotted line in FIG. 3) in order to form a plurality of individual segmented conductors. In the embodiment of FIG. 3, the cut line 90 is a transverse line that extends across the zigzag wire configuration 46 such that it is perpendicular to and intersects each of the axial portions 44 at a midpoint of the axial portion (i.e., the cut line 90 bisects each axial portion 44). The cut line 90 defines a plurality of cut locations 92 along the zigzag shape where the wire 40 is actually severed. As shown in FIG. 3, one cut location 92 is provided on each axial portion 44 of the zigzag configuration.

Any of various means may be used to achieve the cuts at the various cut locations 92. For example, in one embodiment, the wire 40 may be sequentially cut at each of the various cut locations 92 (i.e., the wire is cut at one location and subsequently at another and another). In yet another embodiment, the wire 40 may be simultaneously cut at each of the various cut locations 92 (i.e., the wire is cut at all or multiple cut locations at one time). Any of various tools may also be used to make the aforementioned cuts, such as scissors, snips, blades, or other cutting tools.

Figure 4:
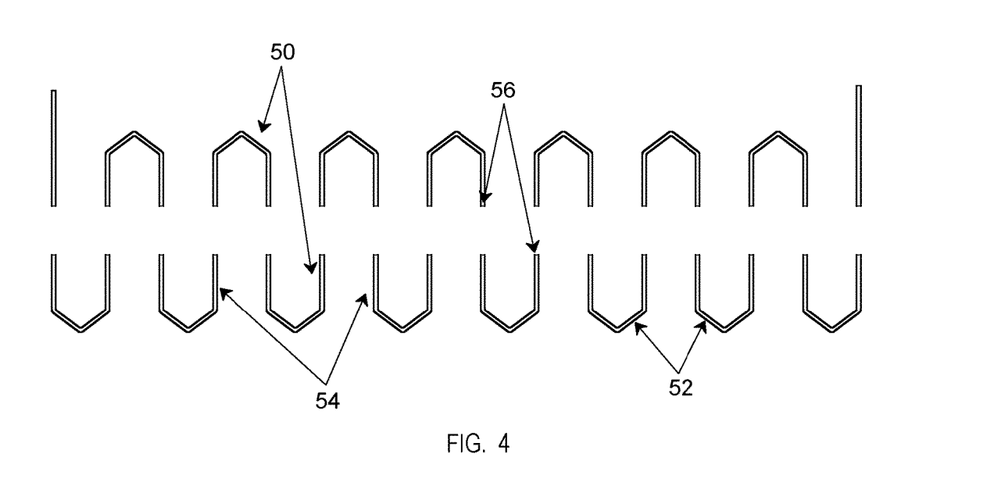
FIG. 4 shows the zig-zag wire of FIG. 3 after it is cut along an axial midpoint in order to form a plurality of individual hairpin conductors.

After the wire 40 in the zigzag configuration 46 is cut along the cut line 90 (e.g., as shown in FIG. 3), a plurality of segmented conductors 50 result, such as those shown in FIG. 4. Because the zig-zag shaped wire 40 is cut along the cut line 90 extending through the midpoint of the straight axial portions, a plurality of identical U-shaped hairpins 50 are formed. The total number of U-shaped hairpins formed is equal to N−1 (where N is the number of axial portions 44 in the zigzag shaped wire). As shown in FIG. 4, because the wire is cut along the midpoint of the straight axial portions 44, a number of hairpin conductors 50 are formed both above the cut line 90 and below the cut line. In order to ensure that the hairpin conductors formed by the cut have a sufficient length, the length of each axial portion 44 of the zig-zag wire 40 is longer than twice the axial length of the stator slots into which the hairpins will be inserted. In other words, when the zig-zag wire 40 shown in FIG. 3 is cut at the cut line 90 (i.e., along the midpoint of the straight axial portions), the result is a number of hairpins 50 as shown in FIG. 4, with each hairpin 50 having an end turn 52 and two straight axial portions/legs 54 that are greater in length than the slot of the stator core into which the axial portions 54 will be inserted. Each axial portion 54 includes a portion of sufficient length to extend through a stator core (i.e., and "in-slot portion") and a leg end 56 on a side of the axial portion that is opposite the end turn 52. The tips of the leg ends 56 result at the previous axial midpoints of the axial portions 44.

After the wire 40 is cut and the hairpins 50 are formed, the windings 24 can then be arranged on the stator core 30. This is accomplished in a conventional manner by first stripping the leg ends 56 of the hairpin in order to expose the conductive material (i.e., strip away any insulation from the wire, if necessary) (or alternatively, if the hairpin was not already coated with insulation, forming insulation material on the hairpin). Next, the legs of the hairpins 50 are inserted into the slots of the stator core 30 with the U-turn portions 52 of each hairpin positioned on the insertion end 36 of the stator core, the straight portions 54 extending through the slots, and the leg ends 56 extending from the connection end 38 of the stator core. The legs are then bent/twisted to form a series of adjacent leg ends on the connection end 38 of the stator core. Thereafter, the leg ends 56 are welded together or otherwise connected to form a complete stator winding.

Figure 5:
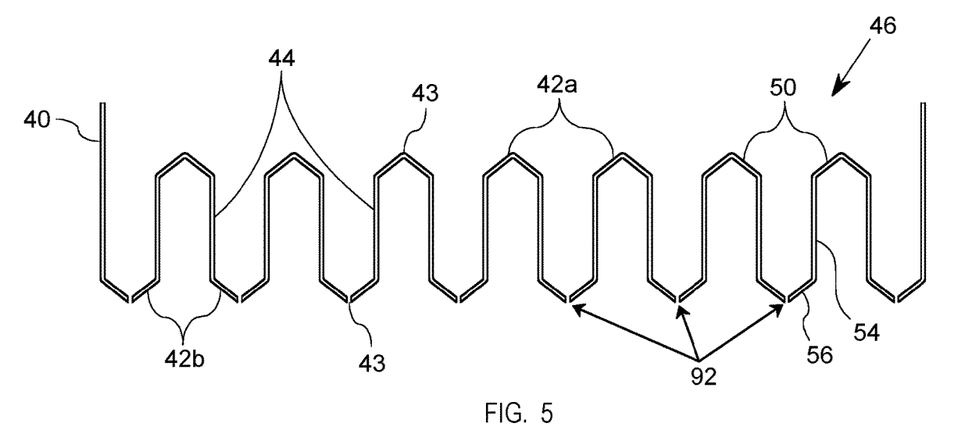
FIG. 5 shows another embodiment of the zig-zag wire of FIG. 3 after the apex of alternating end turns are cut to form a plurality of individual hairpin conductors.
Figure 6:
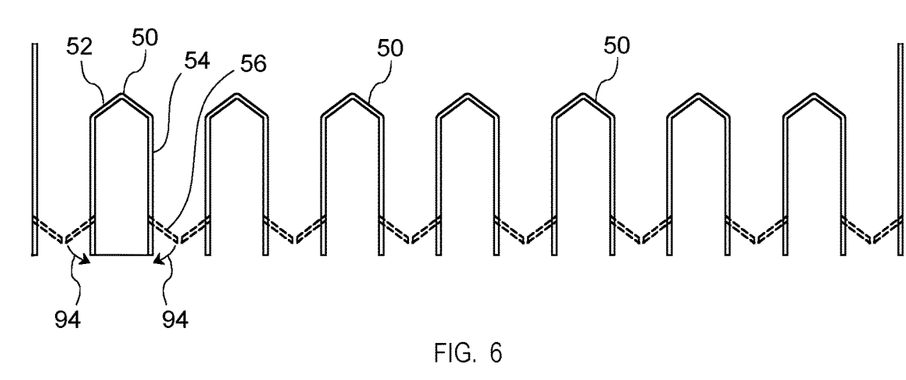
FIG. 6 shows the individual hairpin conductors of FIG. 5 with the leg ends bent into a straight configuration in preparation for axial insertion into an electric machine.

With reference now to FIGS. 5 and 6, a first alternative embodiment of the method of forming segmented conductors is illustrated. This method is similar to that described above in association with FIGS. 1-4. However, after bending the wire 40 into the zigzag configuration 46, instead of cutting the wire 40 in the middle of the axial portions 44 as shown in FIG. 4, in the embodiment of FIGS. 5 and 6 the apex 43 of each end turn 42 is cut on one side of the wire, while the apexes of the end turns 42 on the opposite side of the wire 40 are left uncut. For example, as shown in FIG. 5, the apexes 43 of the lower end turns 42b are cut, but the apexes 43 of the upper end turns 42a remain uncut.

In order to form the hairpins according to the embodiment of FIGS. 5 and 6, the wire 40 is first bent into the zigzag configuration 46. However, the sizes of the end turn portions 42 and axial portions 44 are different in the embodiment of FIGS. 5 and 6. In particular, unlike the embodiment of FIGS. 1-4 where the length of each axial portion 44 is twice the length of two legs 54 of the desired hairpin 50, in the embodiment of FIGS. 5 and 6 the wire 40 is bent such that the length of each axial portion 44 is only equal to the desired length of the in-slot portion of one leg of the final hairpin 50. After bending the wire 40, the wire 40 is cut at the apex 43 of every other end turn (i.e., all of the end turns on one side of the zig-zag wire, such as the upper or lower end turns, are cut at a cut location 92, and all other end turns remain uncut). After cutting the wire 40 at the cut locations 92, N/2 hairpins 50 are formed (where N is the number of axial portions 44 in the zigzag shaped wire), each of the hairpins 50 having leg ends 56 that are angled relative to the straight portions of the legs 54, as shown in FIG. 5. Thereafter, the resulting angled portions of the hairpin legs 54 are straightened, as shown in FIG. 6. To accomplish this, each leg end 56 is bent, as noted by arrow 94 in FIG. 6, such that the entire leg 54 is straight with the in-slot portion in alignment with the leg end. The phantom lines in FIG. 6 show the position of the angled portions of the legs 54 (i.e., leg ends 56 are angled relative to the in-slot portions) prior to bending, and the solid lines show the straight legs after the leg ends 56 are bent into alignment with the in-slot portions. The resulting hairpins 50 are then used to complete stator windings in the same manner as other known processes for forming a hairpin stator (e.g., steps 1-4 of FIG. 12, including insertion of the straight legs into the slots of the stator core and the subsequent re-bending of the leg ends to form adjacent leg ends, and then welding together the tips of adjacent leg ends).

Figure 7:
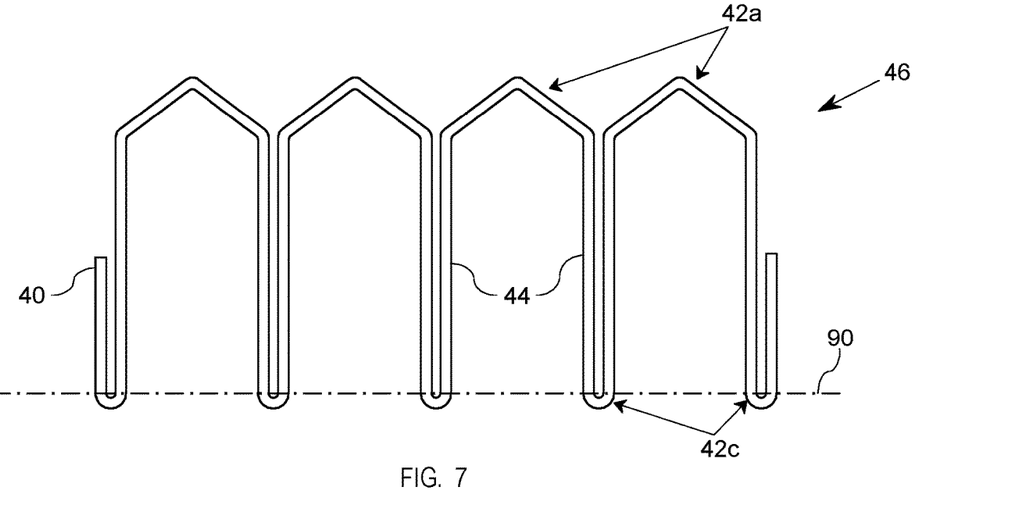
FIG. 7 shows another embodiment of the zig-zag wire of FIG. 3 with end turns having tight curves on one end and more gradual curves on the opposite end.
Figure 8:
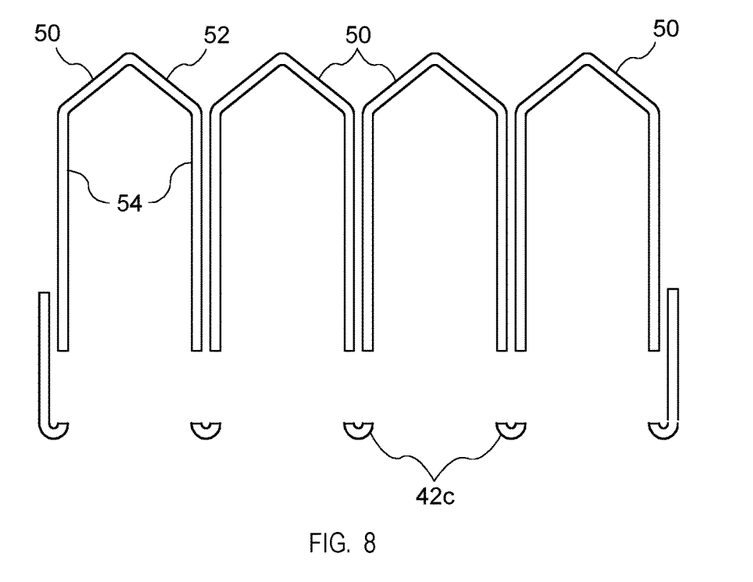
FIG. 8 shows the zig-zag wire of FIG. 7 with the end turns having tight curves removed to form a plurality of individual hair pin conductors.

With reference now to FIGS. 7 and 8 a second alternative embodiment of the method of forming segmented conductors is illustrated. Similar to the other embodiments, the wire 40 is first bent into a zigzag configuration 46, including end turn portions 42 and axial portions 44. However, in this embodiment, the length of each axial portion 44 is equal to the desired length of the in-slot portion and the leg end of the final hairpin 50. Moreover, the zigzag configuration 46 of the wire in this embodiment results in differently shaped end turns on opposite sides of the zigzag configuration. Specifically, the zig-zag wire 40 is formed with normal angled portions on one side (i.e., standard end turn portions 42a) and tight curves/small bends on the opposite side (i.e., tight end turn portions 42c). The standard end turn portions 42a on one side of the wire extend across a relatively wide angle/field of view (e.g., a 45°-135° angle) and have a desired pitch for the end turns 52 of the winding arrangement. In contrast, the tight end turn portions 42c on the opposite side of the wire 40 are extend across a relatively narrow angle/field of view (e.g., a very small angle consistent with a 180° turn) and do not define any pitch that would be useful for end turns in the winding arrangement. The wire 40 may be defined by N/2 or N/2−1 standard hairpin end turns 42a at one axial end and N/2 or N/2−1 tight end turns 42c on the other axial side (where N is the number of axial portions on the wire in the zigzag configuration 46).

As shown in FIGS. 7 and 8, after the wire 40 is shaped into the zigzag configuration 46, the wire 40 is cut along the transverse cut line 90. The cut line 90 intersects the axial portions 44 closer to the lower end turns 42c than the upper end turns 42a, and particularly in close proximity to the apexes of the lower end turns 42c. Although the end turns 42c are severed near their apexes, because the turns are so sharp, only a small portion of the wire needs to be cut in order to sever the entire end turn 42c. After the end turns 42c are all cut off, only the standard end turns 42a remain with two straight axial portions 44 extending from each end turn portion 42a. The result of this process is a series of hairpins 50, as shown in FIG. 8, each hairpin 50 having one end turn 52 with a desired pitch and two straight axial portions 54 extending from the opposite sides of the end turn. Advantageously, because the tight end turns 42c are so small, the amount of scrap produced from this process is relatively small.

After forming the hairpins 50 of FIG. 8, the hairpins 50 may be used to complete stator windings in the same manner as other known processes for forming a hairpin stator (e.g., steps 1-4 of FIG. 12), including insertion of the straight legs into the slots of the stator core and the subsequent bending of the leg ends to form adjacent leg ends, and then welding together the tips of adjacent leg ends.

Figure 9A:
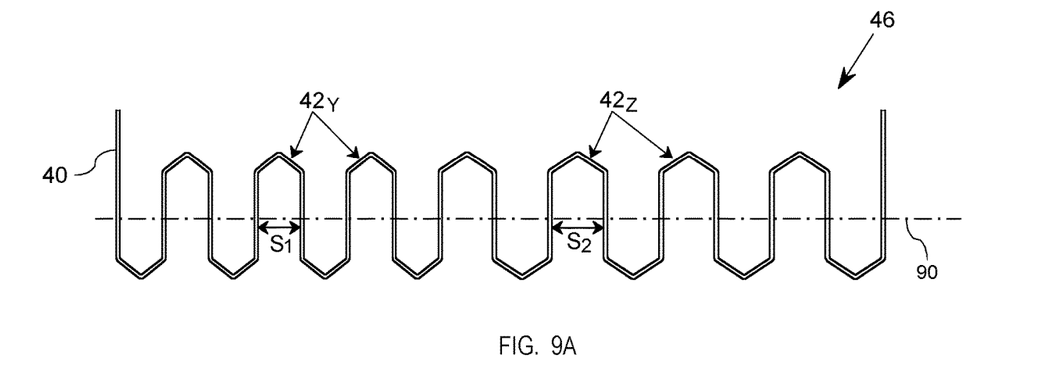
FIG. 9A shows another embodiment of two of the zig-zag wires of FIG. 3 with the end turns having two different pitches in order to form different types of hairpins for the winding arrangement.
Figure 9B:
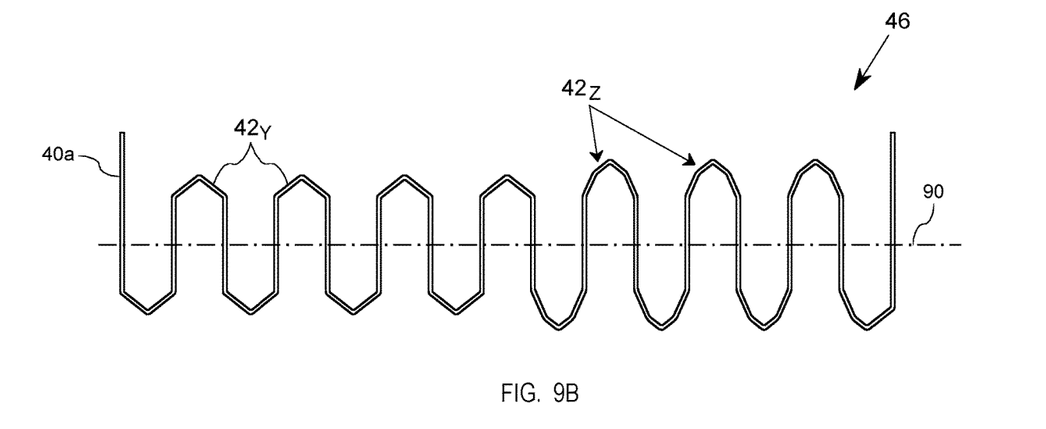
FIG. 9B shows another embodiment of two of the zig-zag wires of FIG. 3 with the end turns having two different heights in order to form different types of hairpins for the winding arrangement.

With reference now to FIGS. 9A and 9B, another embodiment of the method of forming segmented conductors is illustrated. As shown in FIGS. 9A and 9B, it may be desirable to form segmented conductors 50 have different shapes, heights or spans for the end turns. For example, for a machine having more than one layer, each layer may require P/2 hairpins where P=# of poles. It also may be desirable to have just one or two hairpins of a different shape, height or span. Different layers may need different shape end turns because slot A and slot B radiant from the center axis at an angle. Therefore, as shown in the zig-zag wire 40 of FIG. 9A, end turns 42z associated with layers that are closer to the outer diameter (OD) of the stator have a longer pitch/span (s2) than the end turns 42y associated with layers closer to the inner diameter (ID) of the stator (which ID end turns 42y) have a shorter span (s1). It will be recognized that in this embodiment of FIG. 9A, the end turns 42y define a first winding pitch along a first length of the wire on a first side of the zigzag shape 46, and the end turns 42z define a second winding pitch along a second length of the wire on a second side of the zigzag shape.

As shown in the zig-zag wire of FIG. 9B, in at least some embodiments, the end turns 42z associated with layers that are closer to the OD may have taller/elongated end-turn portions than the end turns 42y that are associated with layers closer to the ID. This allows the taller end turns to be bent to span a greater distance/pitch in layers associated with the OD. According to the embodiment of FIG. 9B, the zig-zag wire is formed with almost half the hairpin forms at a first width or height and almost another half at a second width or height. A cut line is shown in FIGS. 9B to illustrate that the zig-zag wire is cut similar to that of FIGS. 1-4 to form the hairpins and the stator windings. In other embodiments, the zig-zag wire 40 having end turns of differing spans and/or heights may be formed and cut similar to the embodiments shown in FIGS. 5-8 in order to form the hairpins and the associated stator windings.

Figure 10:
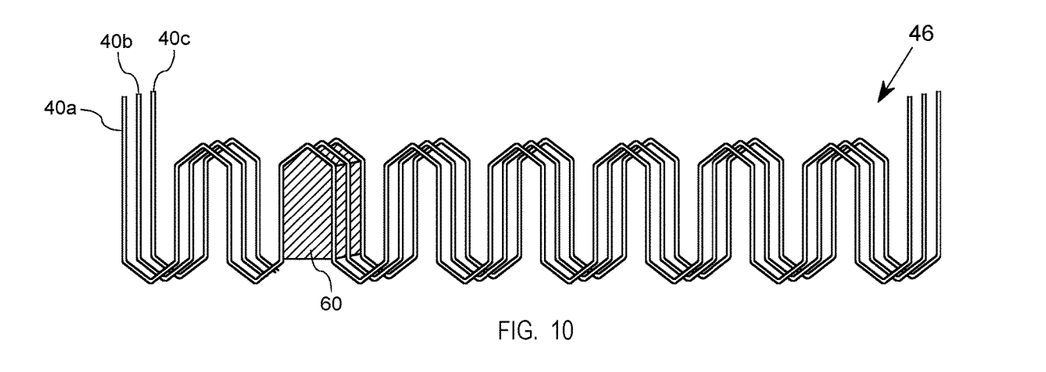
FIG. 10 shows multiple lengths of wire after being simultaneously bent into a zig-zag shape with a plurality of forming structures.

While the embodiments of FIGS. 1-9B show the formation of one zig-zag wire at a time, when more hairpins are required, multiple zig-zag wires may be formed in parallel during the bending process (e.g., as shown in FIGS. 1-2 of previously mentioned U.S. Pat. No. 10,038,358). This simultaneous formation of multiple zigzag wires is illustrated in FIG. 10. As shown in FIG. 10, multiple wires 40a-40c are simultaneously formed into one of the zigzag configurations using a plurality of forming structures 60. The zigzag configuration may be any desired configuration, such as those illustrated in FIGS. 1-9B. In order to form the multiple zigzag configurations, wires 40a-40c are collectively arranged side-by-side and inserted between the plurality of forming structures 60 in an expanded configuration. The forming structures 60 are then moved to a contracted configuration, which results in simultaneously bending each of the plurality of wires 40a-40c into a zigzag shape. After the simultaneous formation of multiple zig-zag shaped wires 40a-40c, each of the zig-zag wires is cut at various cut locations in order to form a plurality of segmented conductors 50.

Figure 11:
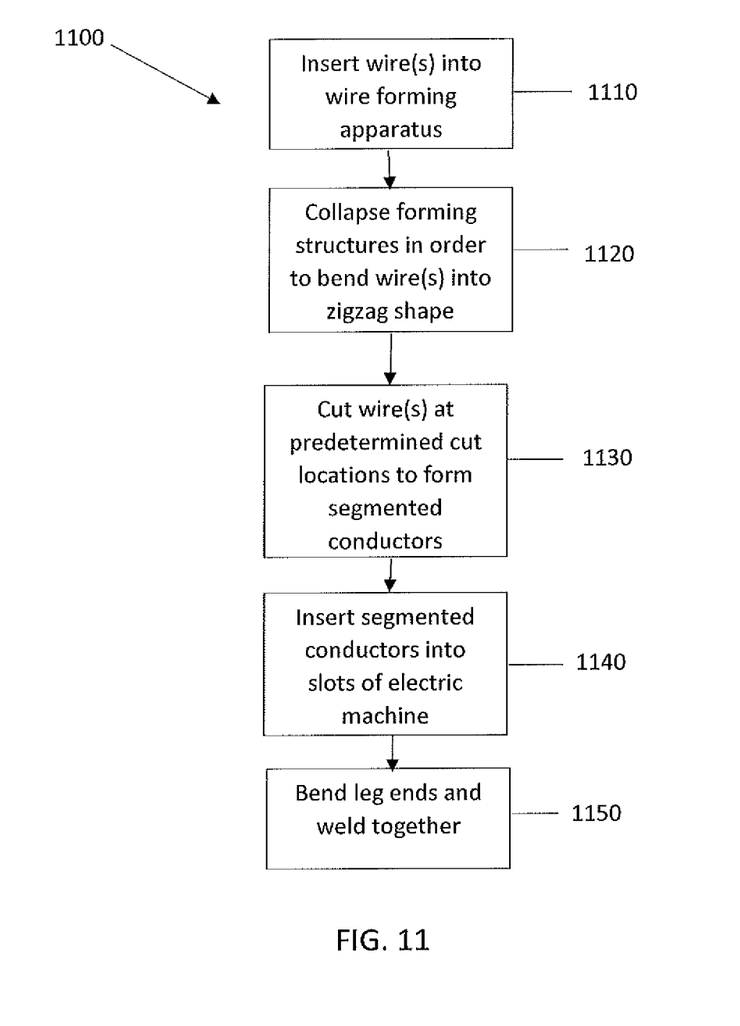
FIG. 11 shows a block diagram of a method of making a winding for an electric machine based on the embodiments disclosed in FIGS. 1-10.

The above embodiments all describe a method of making conductors and an associated electric machine winding. As discussed above, in at least some embodiments, the method is accomplished using an automated method using a wire forming apparatus, such as that shown in U.S. Pat. No. 10,038,358. FIG. 11 provides a summary of the method in block diagram form. As shown in FIG. 11, the method 1100 begins at block 1110 when one or more elongated wires are arranged in parallel and inserted between the forming structures of a wire forming apparatus with the forming structures in an expanded position (i.e., the forming structures are spaced apart with large gaps between the forming structures). Each of the forming structures has a predetermined shape that is capable of creating the desired zigzag configuration. After the wires are inserted between the forming structures, the method continues as noted at block 1120, and the forming structures are contracted (i.e., moved together such that the forming structures are aligned side-by-side/ adjacent to one another, with only a small gap between each adjacent forming structures to accommodate the wires, such as the arrangement shown in FIG. 2). Moving the forming structures from the expanded position to the contracted position results in each of the wires being bent into the zigzag configuration (e.g., one of the configurations of FIGS. 3-9B, depending on the shape(s) of the forming structures. Thereafter, as noted at block 1130, the wires are cut at predetermined cut locations in order to form segmented conductors. Any resulting scrap (which may only be present in some embodiments) is then discarded, leaving only segmented conductors remaining from the previous elongated stretch of wire. The remaining segmented conductors are then prepped for insertion into the slots of a stator core (e.g., by stripping insulation from the tips of the leg ends, straightening the leg ends, etc., if appropriate). Then, as noted at block 1140, the segmented conductors are inserted into the slots of the stator core. Subsequently, as noted at block 1150, the leg ends of the segmented conductors are bent to result in adjacent leg ends. The adjacent leg ends are then welded together or otherwise connected in order to complete the winding arrangement on the stator core.

The foregoing detailed description of one or more embodiments of a method of making electric machine windings has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

Various embodiments are presented in the drawings and in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

What is claimed is:

1. A method of forming a winding for an electric machine comprising:

bending a wire between a plurality of forming structures such that the wire is bent into a zigzag shape, wherein the zigzag shape of the wire defines a plurality of first end turns on one side of the zigzag shape, a plurality of second end turns on an opposite side of the zigzag shape, and a plurality of straight axial portions extending between the first end turns and the second end turns, the first end turns having an angled shape that defines a desired pitch for end turns of a winding of the electric machine, and the second end turns having a tight curve shape that defines a smaller pitch than the desired pitch such that the second end turns define tighter curves than the first end turns and the smaller pitch is less than any useful pitch for the end turns of the winding of the electric machine; and cutting the wire at a plurality of cut locations along the zigzag shape to form a plurality of segmented conductors, each of the segmented conductors including a single end turn and two cut legs extending from opposite sides of the single end turn, wherein said plurality cut locations are located closer to the second end turns than the first end turns-such that the cutting results in (i) a first plurality of segmented conductors each including one of the first end turns and two long legs formed on the one side of the zigzag shape and (ii) a second plurality of segmented conductors each including the second end turns and two short legs formed on the opposite side of the zigzag shape;

inserting the legs of the first plurality of segmented conductors into slots of a stator core in an axial direction such that the single end turn of each of the first plurality of segmented conductors is positioned at one end of the stator core and the two cut legs of each of the first plurality of segmented conductors extend from an opposite side of the stator core; and scrapping the second plurality of segmented conductors.

2. The method of claim 1 further comprising bending the legs of each of the first plurality of segmented conductors to form a series of leg ends, and welding adjacent leg ends together.

3. The method of claim 1 wherein at least the first end turns define a first winding pitch along a first length of the wire on a first side of the zigzag shape, and wherein said first end turns define a second winding pitch along a second length of the wire on a second side of the zigzag shape.

4. The method of claim 1 wherein at least the first end turns define a first end turn height along a first length of the wire on a first side of the zigzag shape, and wherein said first end turns define a second end turn height along a second length of the wire on a second side of the zigzag shape.

5. The method of claim 1 wherein said act of bending said wire between the plurality of forming structures includes inserting a plurality of wires between the plurality of forming structures and bending each of the plurality of wires into a zigzag shape, and wherein said act of cutting said wire at the plurality of cut locations includes cutting each of said plurality of wires at the cut locations.

6. The method of claim 1 wherein each of the forming structures includes two parallel axial surfaces and a reversal surface bridging the two parallel axial surfaces.

7. The method of claim 6 wherein bending the wire between the plurality of forming structures comprises inserting wire between a plurality of forming structures of a wire forming apparatus positioned in an expanded configuration, and moving the forming structures of the wire forming apparatus into a contracted configuration such that the wire is bent into a zigzag shape.

8. The method of claim 1 wherein the angled shape of the first end turns defines an angle of 45-135 degrees, and wherein the tight curve shape of the second end turns defines an arc of 180 degrees.

9. The method of claim 1 wherein the length of each straight axial portion of the wire with the zig-zag shape is at least as long as a length of the slots of the stator core.

10. The method of claim 1 wherein the cut locations are in close proximity to the second end turns.

11. A method of making segmented conductors for an electric machine winding, the method comprising:

bending a wire into a zigzag shape, the zigzag shape defining (i) a plurality of angled portions defining a desired pitch for end turns of the electric machine winding on one side of the zigzag shape, (ii) a plurality of tight curves defining a smaller pitch than the desired pitch on an opposite side of the zigzag shape, wherein the smaller pitch is less than any useful pitch for end turns of the electric machine winding; and (iii) a plurality of straight axial portions extending between the angled portions and the tight curves, wherein the plurality of angled portions and the plurality of tight curves are bent simultaneously during the act of bending the wire into the zigzag shape, wherein a transverse line is defined that intersects each of the straight axial portions of the zigzag shape at a plurality of cut locations, wherein cut locations are locations in closer proximity to the plurality of tight curves than the plurality of angled portions; and cutting the wire at the plurality of cut locations along the zigzag shape to form a plurality of segmented conductors, each of the segmented conductors including a single end turn provided by one of the plurality of angled portions and two cut legs provided by two of the straight axial portions extending from opposite sides of the single end turn; and inserting the cut legs of the plurality of segmented conductors into slots of a stator core in an axial direction such that the single end turn of each of a first plurality of segmented conductors is positioned at one end of the stator core and ends of the cut legs of each of the first plurality of segmented conductors extend from an opposite side of the stator core.

12. The method of claim 11 further comprising scrapping the plurality of tight curves segmented conductors.

13. The method of claim 11 wherein the angled portions define an angle of 45-135 degrees, and wherein the tight curves define an arc of 180 degrees.

14. The method of claim 11 wherein the length of each straight axial portion is at least as long as a length of the slots of the stator core.

15. The method of claim 11 further comprising bending the cut legs to form a series of adjacent leg ends, and welding the adjacent leg ends together.

* * * * *